(12) United States Patent
MacCormick et al.

(10) Patent No.: US 7,734,573 B2
(45) Date of Patent: Jun. 8, 2010

(54) EFFICIENT RECOVERY OF REPLICATED DATA ITEMS

(75) Inventors: John P. MacCormick, Mountain View, CA (US); Chandramohan A. Thekkath, Palo Alto, CA (US); Lidong Zhou, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 11/013,274

(22) Filed: Dec. 14, 2004

(65) Prior Publication Data

US 2006/0129612 A1  Jun. 15, 2006

(51) Int. Cl.
*G06F 17/30* (2006.01)
(52) U.S. Cl. ..................... 707/202; 707/204
(58) Field of Classification Search .................. None
See application file for complete search history.

(56) References Cited

U.S. PATENT DOCUMENTS

| | | | | |
|---|---|---|---|---|
| 4,503,535 A * | 3/1985 | Budde et al. | | 714/47 |
| 5,485,608 A * | 1/1996 | Lomet et al. | | 707/202 |
| 5,673,382 A * | 9/1997 | Cannon et al. | | 714/6 |
| 5,742,792 A * | 4/1998 | Yanai et al. | | 711/162 |
| 5,832,514 A * | 11/1998 | Norin et al. | | 707/202 |
| 5,933,838 A * | 8/1999 | Lomet | | 707/202 |
| 6,061,770 A * | 5/2000 | Franklin | | 711/162 |
| 6,119,128 A * | 9/2000 | Courter et al. | | 707/202 |
| 6,163,856 A * | 12/2000 | Dion et al. | | 714/4 |
| 6,658,590 B1 * | 12/2003 | Sicola et al. | | 714/6 |
| 7,051,050 B2 * | 5/2006 | Chen et al. | | 707/200 |
| 7,054,927 B2 * | 5/2006 | Ulrich et al. | | 709/223 |
| 7,111,021 B1 * | 9/2006 | Lewis et al. | | 707/202 |
| 7,149,858 B1 * | 12/2006 | Kiselev | | 711/162 |
| 7,185,227 B2 * | 2/2007 | Eguchi et al. | | 714/15 |
| 7,222,136 B1 * | 5/2007 | Brown et al. | | 707/202 |
| 7,240,364 B1 * | 7/2007 | Branscomb et al. | | 726/9 |
| 7,340,640 B1 * | 3/2008 | Karr et al. | | 714/6 |
| 2005/0065986 A1 * | 3/2005 | Bixby et al. | | 707/204 |
| 2005/0071336 A1 * | 3/2005 | Najork et al. | | 707/8 |
| 2006/0047895 A1 * | 3/2006 | Rowan et al. | | 711/112 |

\* cited by examiner

*Primary Examiner*—Don Wong
*Assistant Examiner*—Shyue Jiunn Hwa
(74) *Attorney, Agent, or Firm*—Woodcock Washburn LLP (57) ABSTRACT

Methods and apparatuses are provided for recovering one or more replicated datasets. In accordance to some embodiments of the invention, this is accomplished by determining whether a log contains one or more entries indicating a corruption in a replicated data item; and recovering the replicated data item if the log contains any such entries. The log, however, is maintained at a higher layer in a software hierarchy than the layer at which the replicated data item is recovered. As a result, there is no need to maintain a separate replication log at the layer where the replicated data item is recovered. In accordance to some embodiments of the invention, this is accomplished by recording an entry indicating that an operation was performed on a replicated record in a log at a higher layer in a software hierarchy, determining whether a failure occurred during the operation, and reconciling the replicated record at a lower layer in the software hierarchy if it is determined that a failure occurred during the operation. As a result, the present invention eliminates the need for additional disk writes required by conventional techniques that use a replication log to at the same layer where the data recovery is performed.

12 Claims, 6 Drawing Sheets

EFFICIENT RECOVERY OF REPLICATED DATA ITEMS

FIELD OF THE INVENTION

The present invention relates generally to software and more specifically to recovery of replicated data items.

BACKGROUND OF THE INVENTION

In computer systems, redundant copies of important data may be used to provide data availability, reliability and consistency. One way of recovering data from a failure (e.g., crash of a disk, disk array, or other storage device, corruption of a database, application program, or operating system, and the like), is to scan entire datasets to determine and then reconcile inconsistencies. This process, however, may be expensive and introduce significant recovery delays. Another conventional approach to data recovery is to maintain a log of updates that have not been applied to all replicas of a data item. This approach requires only the data segments in the log to be examined to determine and reconcile any differences between replicas, but requires additional disk writes in order to maintain the log.

Conventional systems may involve one or more data item replicas, stored on different storage devices (e.g., physical device, disk drives, disk arrays, RAIDs, solid state memories, and the like). A conventional system may access data on the physical devices, using commands (e.g., "data=read (replica, offset)," "write (replica, offset, data)," and others). For example, the command "dataBuffer=read (A,4352)" reads data stored at offset 4352 on device A into a buffer. An offset provides an indication of a storage location for a particular set of data. A replica is a copy or duplicate of a data item, individual field, record, or other item within a dataset. For example, the command "write (B,2343, 'wombat')" would write the character string "wombat" at offset 2343 on device B. In a system where a data item is replicated at two or more independent locations (also referred to as "replicas"), each replica must be updated in such a way as to maintain consistency with all others replicas. That is, changes made to an item in the dataset must be reflected identically in all replicas of that dataset. We refer to this consistency guarantee as the "replication invariant."

Replicating data items using write commands, however, presents several problems when failures occur. For example, the replication invariant is violated when the system fails after completing the write to device A but before completing the write to device B. To correct this problem, the system must perform an expensive recovery procedure after a failure. In such cases, data on devices A and B must be read to determine whether there are any differences in the copies of the replicated data item stored on those devices. Any differences in the copies resulting from the failure of a storage device require corrections to properly restore the copies.

The process by which all copies of the replicated data items are made identical to each other is referred to as reconciliation. Reconciliation is performed by copying device A's version of the data to device B or vice versa. In this way, a complete and correct copy of the data item is restored. Repeating this process for each replicated data item, however, may be costly both in terms of time and effort, since the entire dataset must be analyzed. As discussed above, another conventional technique for implementing replicated write on a data item is to use a replication log, which keeps track of the offsets that have not been consistently updated on all replicas.

In cases where a replication log is used, a replicated Write (offset, data) operation is logically equivalent to three sub-operations: "log(offset); write(data, A), write(data, B); unlog (offset)," where the unlog operation erases the prior log operation. This type of replicated write operation enables quick recovery from a failure of a physical storage device. In the event of a failure, log entries are examined for updates that were in progress at the time of the failure, and affected replicas are reconciled. Using replication logs is quicker than analyzing the entire set of data for consistency because only a subset of the data items needs to be analyzed (i.e. that portion that was being modified at the time of the failure). In order for the log to be persistent (and thus survive failures), however, it must be written to stable storage. Thus, an extra disk write is required for every replicated write operation using a replication log, thereby significantly increasing the latency of write operations, which results in a severe performance degradation of write-intensive operations.

Thus, what is needed is a solution for recovering from a failure without incurring the extra log write for each replicated write.

SUMMARY OF THE INVENTION

The present invention provides improved methods and apparatuses for recovering one or more replicated data items. In accordance to some embodiments of the invention, this is accomplished by determining whether a log contains one or more entries indicating a corruption in a replicated data item; and recovering the replicated data item if the log contains any such entries. The log, however, is maintained at a higher layer in a software hierarchy than the layer at which the replicated data item is recovered. As a result, there is no need to maintain a separate replication log at the layer where the replicated data item is recovered.

In accordance to some embodiments of the invention, this is accomplished by recording an entry indicating that an operation was performed on a replicated record in a log at a higher layer in a software hierarchy, determining whether a failure occurred during the operation; and reconciling the replicated record at a lower layer in the software hierarchy if it is determined that a failure occurred during the operation.

As a result, the present invention eliminates the need for additional disk writes required by conventional techniques that use a replication log at the same layer where the data recovery is performed.

Additional features and advantages of the invention are set forth in the following description, are obvious from the description, or may be learned by practicing the described techniques. The features and advantages may be realized and obtained by means of the implementations and combinations particularly pointed out in the appended claims.

DETAILED DESCRIPTION OF THE PREFERRED EMBODIMENTS

Implementations may be performed in numerous ways, including as a process, an apparatus, a system, a computer readable medium includes a transmission medium and a computer readable storage medium or a computer network wherein program instructions are sent over optical or electronic communication links. In general, the order of the steps of any disclosed processes may be performed in any arbitrary order, unless otherwise indicated by the process. A detailed description of one or more embodiments is provided below along with accompanying figures. Implementations are described in connection with such embodiments, but are not limited to any embodiment. The scope of the detailed description is limited only by the claims, and encompasses numerous alternatives, modifications and equivalents.

Figure 1A:
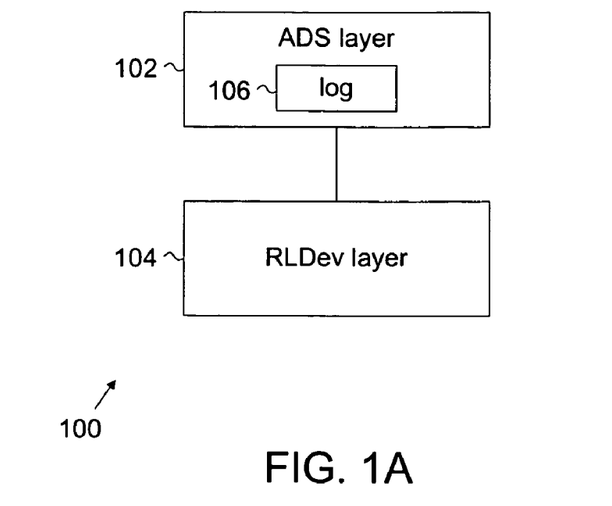
FIG. 1A is a block diagram of an exemplary software hierarchy, in accordance to some embodiments of the invention.

FIG. 1A illustrates an exemplary software hierarchy suitable for implementing a system 100 suitable for recovering replicated data items, in accordance to some embodiments of the invention. System 100 includes multiple layers, including an abstract data structure (ADS) layer 102 and a replicating logical device (RLDev) layer 104. Log 106 is included in ADS layer 102 and used for recording changes to replicated data items. Log 106 may store entries associated with changes to data items for which multiple copies are maintained at a lower layer (e.g. RLDev Layer 104) in the software hierarchy. These data items are also referred to as replicated data items. A layer in a software hierarchy is generally thought of as a portion of the software in a system that performs certain related functions, provides information encapsulation, and exchanges information with other software layers primarily through a set of predefined software interfaces or APIs. A lower layer in a software hierarchy typically provides some form of services to a higher layer in the hierarchy. For example, in FIG. 1A, RLDev layer 104 provides replication/recovery services to ADS layer 102. As a result, in some embodiments, RLDev layer 104 must be recovered before ADS layer 102.

When a failure occurs during the process of updating a replicated data item, a recovery operation must be performed to ensure the integrity of the replicated data item. In some embodiments, software at RLDev layer 104 may consult log 106 in ADS layer 102 during the recovery operation. While only ADS layer 102 and RLDev layer 104 are shown for illustration purposes, the invention is not limited to any particular number of layers. In fact, the principles of the present invention are applicable to systems with software hierarchies with an arbitrary number of layers.

Replicated data items may be stored at layers throughout system 100. For example, recovery of replicated data items may use data from log 106. In some examples, entries in log 106 may record the location (e.g. the offset in an addressing scheme) where copies of the replicated data item are stored. An offset may be a value that, when added to a base value, indicates the location of data (e.g., an individual data item or an entire dataset). Thus, data at one layer may be used by software at a second layer to recover data corrupted at, for example, a third layer. In some examples, data associated with records stored in log 106 may include a location on a physical or storage device for the actual data indicated by the record, or the type of operation performed on a data item. As an example, data item may refer to an individual record, field, or other discrete set of data within a dataset.

Figure 1B:
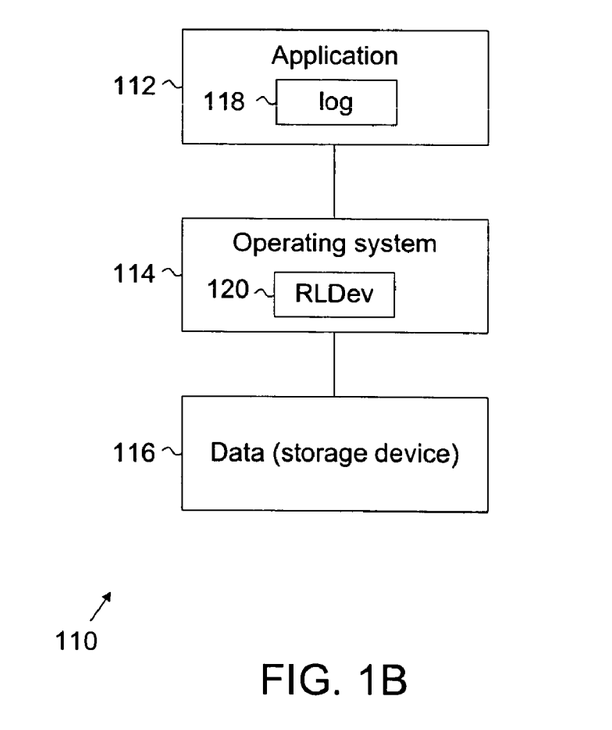
FIG. 1B is a block diagram of an exemplary software hierarchy, in accordance to some embodiments of the invention.

FIG. 1B illustrates an exemplary system 110, in accordance to some embodiments of the invention. System 110 is analogous to system 100, except that it includes application layer 112, operating system layer 114, and data layer 116. In some examples, application layer 112 may be implemented as an ADS layer including log 118, which is analogous to log 106 in FIG. 1A. Operating system layer 114 may be implemented using a replicating device module (RLDev) 120, which may be used to restore data layer 116 after a failure, using entries in log 118. In this example, data layer 116 may be a physical, logical, or other implementation of a storage device. Recovery may be performed by using data from log 118 to determine what data items were potentially corrupted. After a failure, the entries in log 118 are examined to determine if any replicated data items are potentially corrupted (e.g. whether the log indicates that an operation modifying the replicated data item had began, but had not been completed before the failure occurred, thereby causing different copies of the replicated data items to have inconsistent values). All copies of a potentially corrupted replicated data item are then reconciled by comparing the various copies of the data item at RLDev layer 120. If any of the copies have a value that differs from the others, that copy is overwritten with one of the other, uncorrupted copies. In some embodiments, the entries in log 118 further indicate the desired value of the replicated data item at the time the failure occurred. In such embodiments, all copies of the replicated data item are given that desired value. For purposes of illustration, an uncorrupted copy of a replicated data item is a copy of the data item that was unaffected by the failure. In some examples, corruption may be the incorrect or incomplete performance of an operation on a data item when a failure (e.g., disk failure) occurred. In other examples, a replicated data item may be a copy of a data item before the operation was performed and before the failure occurred. A replicated data item may be used to restore a failed storage device by replacing a corrupted data item.

Figure 2:
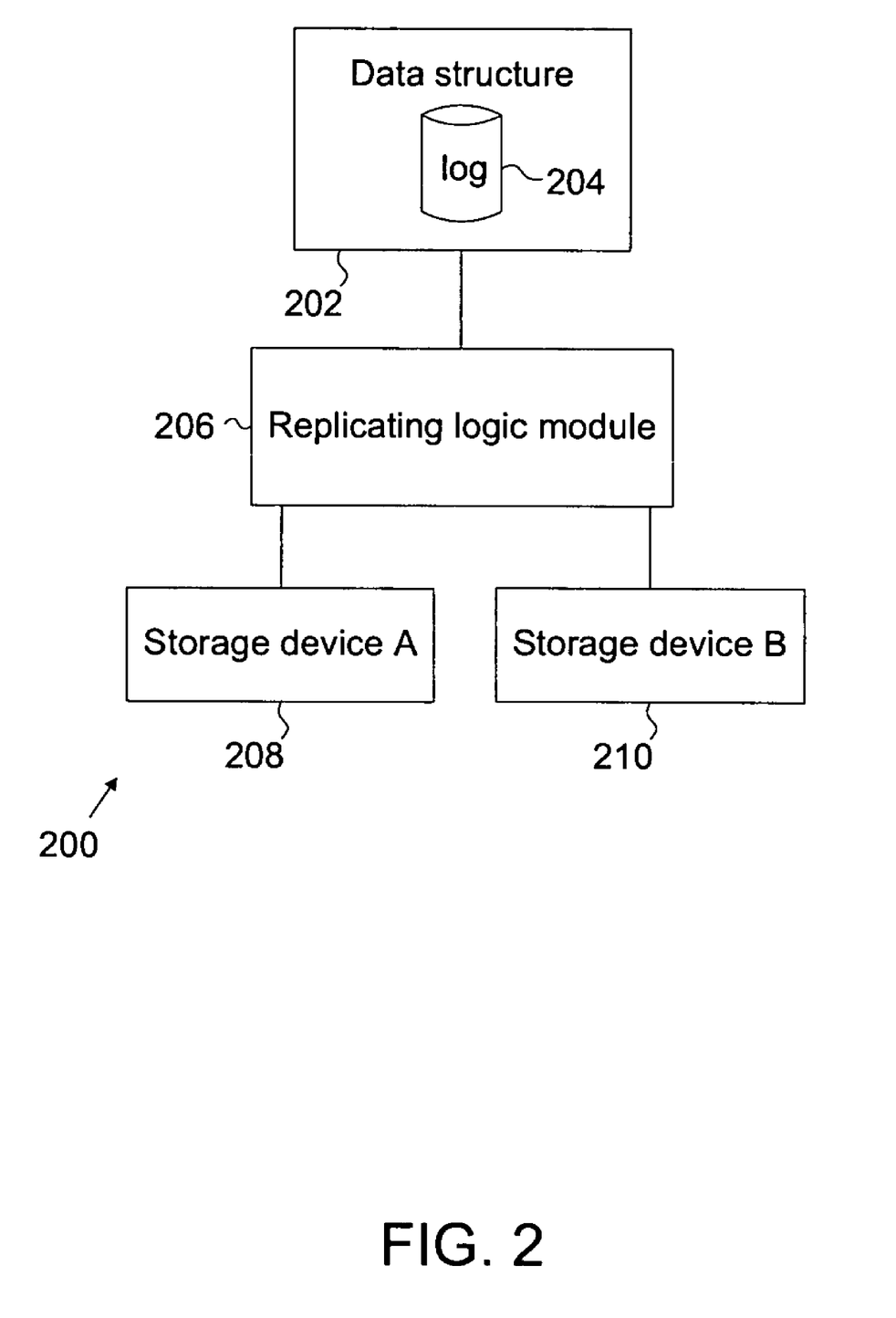
FIG. 2 is a functional block diagram illustrating the components of an exemplary system for recovering replicated data items, in accordance to some embodiments of the invention.

FIG. 2 illustrates an exemplary system suitable for implementing replica recovery. System 200 includes log module 202, which in turn includes log 204, replication/recovery module 206, and storage devices 208 and 210. In some examples, log 204 may be implemented separately from log module 202. In some examples, log 204 may be implemented at a layer above log module 202. Generally, log 204 is significantly smaller in size than storage devices 208 and 210. Entries in log 204 may be used to record offsets, indicating whether an operation was performed on a data item and an actual location for the data item on storage devices 208 and 210. As an example, a log entry may take the form: "log (operation, offset)" or "log(operation, value, offset)". An offset mentioned in a log entry that indicates that an operation was in progress at the time of a failure may be referred to as a "dirty offset." In the event of a failure, a scan of log 204 may be used to infer or determine from the log entries which data items require reconciliation. By scanning log 204, system 200 determines data items that were affected by the failure, as well as what operations were in progress on those data sets at the time of failure. By reconciling replicated data items using uncorrupted copies, corrupted copies of the replicated data items are overwritten, thus enabling recovery of a failed storage device, potentially corrupt data item, or lost data.

In some embodiments, replication module 206 simply examines log 204 instead of maintaining a separate log, thereby eliminating the additional disk write that would be needed to maintain a separate log. Log module 202 records offsets that indicate whether an operation was performed, the type of operation, and the data item affected by the operation in log 204. Examples of such operations may include insertions, deletions, replicated writes, and others.

Figure 3:
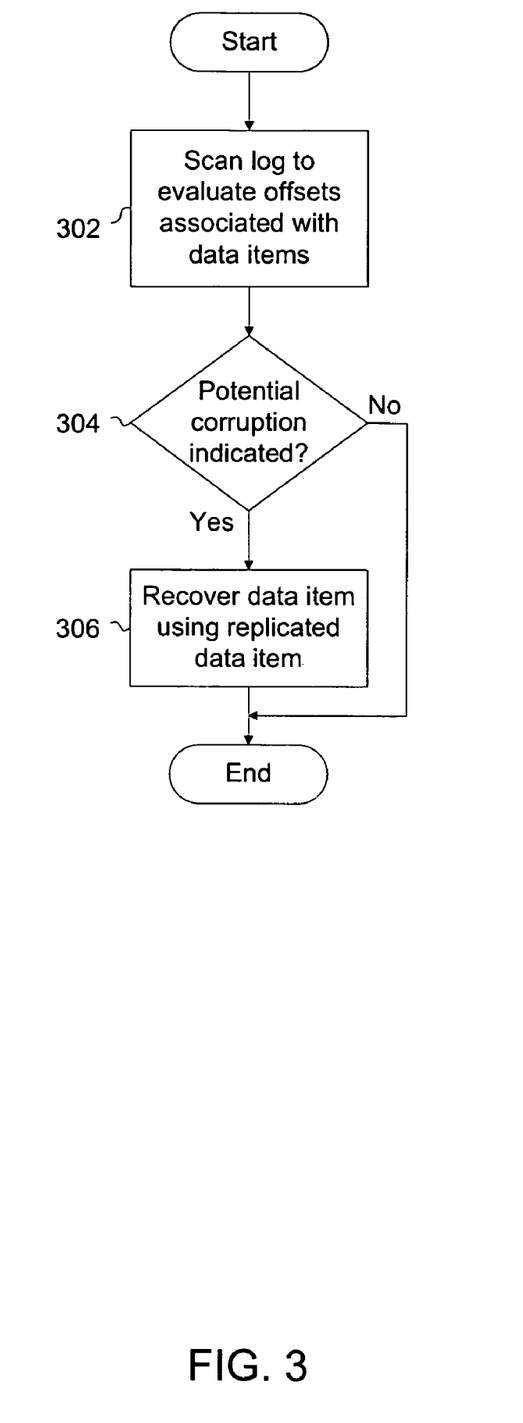
FIG. 3 is a flow diagram illustrating an exemplary process for recovering replicated data items, in accordance to some embodiments of the invention.

FIG. 3 illustrates an exemplary process 300 for recovering replicated data items, in accordance with some embodiments of the invention. Following a failure, log 204 is scanned to determine whether any log entries indicate that an operation was being performed on a data item when the failure occurred. If the scan results in an "exception," which is an indication that an operation was being performed on a data item when a failure occurred, a potentially corrupted data item is detected (304). If no potentially corrupted data items are detected, process 300 terminates. Otherwise, any corrupted data items are recovered (306). In some examples, recovery includes reconciling all copies of a replicated data item by replacing any corrupted copies with uncorrupted copies. This is repeated until all data items determined to be potentially corrupt at stages 302-304 are recovered.

The process of determining whether a data item was affected by a failure may also be referred to as "inferring" whether a given data item was corrupted. In some examples, "inferring" may include explicitly or implicitly (e.g., reading a related data item, from which another data item may be determined) reading entry from a log (e.g., log 204). For example, the entry may indicate the actual location of the data item, the particular storage device (e.g., storage devices 208 and 210), and the type of operation that was performed on the data item and the desired value of the data item. In other examples, different techniques or processes may be used.

Figure 4:
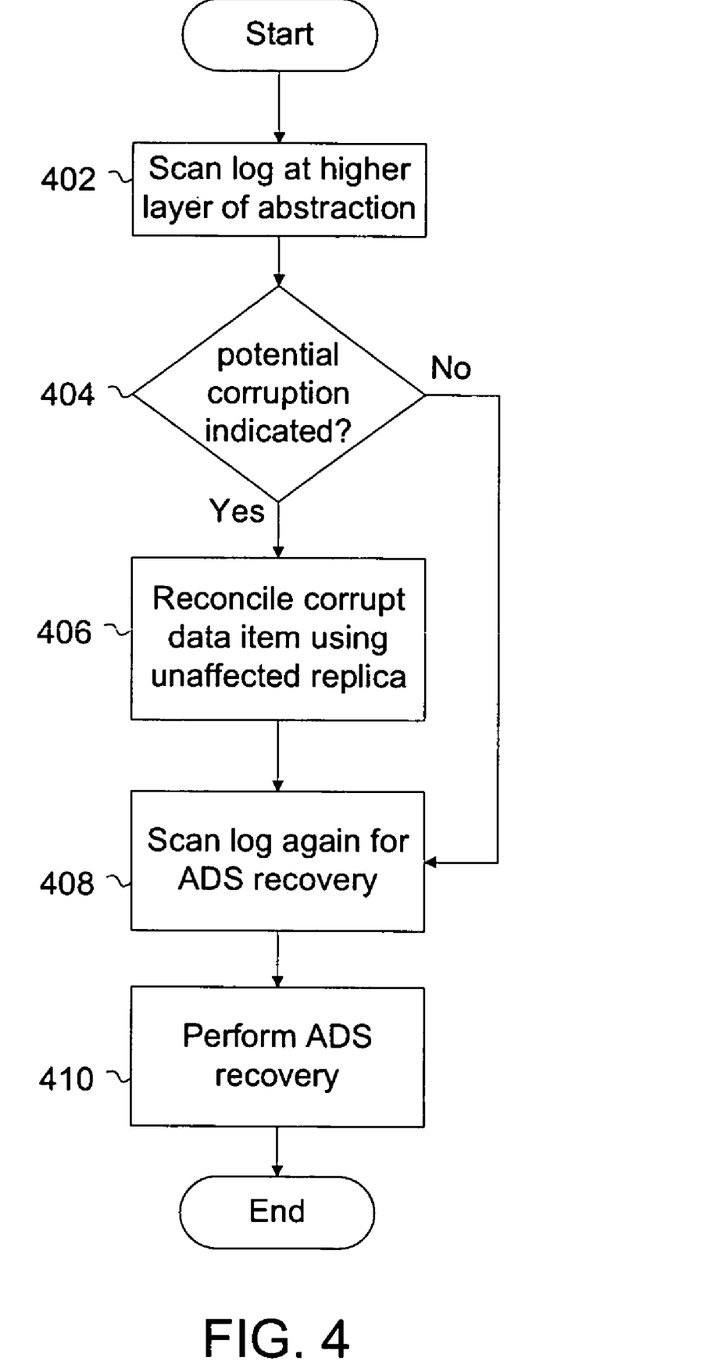
FIG. 4 is a flow diagram illustrating an exemplary process for recovering replicated data items, in accordance to some embodiments of the invention.

FIG. 4 illustrates an exemplary process 400 for recovering replicated data items in the event of a failure using a log (e.g., log 204) maintained at a different layer than the layer at which the recovery operation is performed. As an example, replication module 206 may perform a scan to access log 204 at a higher layer of abstraction than replication module 206 (402). The scan of log 204 infers any offsets to determine whether a data item is corrupted or potentially corrupted (404). If a data item is corrupted, then reconciliation is performed to recover the data at a lower layer (406). Otherwise, process 400 proceeds to stage 408. After the reconciliation is performed, then the log is scanned a second time in order to recover data at the higher layer (e.g., ADS layer) (408). Based on the results of the second scan data at the higher layer (e.g., ADS) is then recovered (410) and process 400 terminates.

Figure 5:
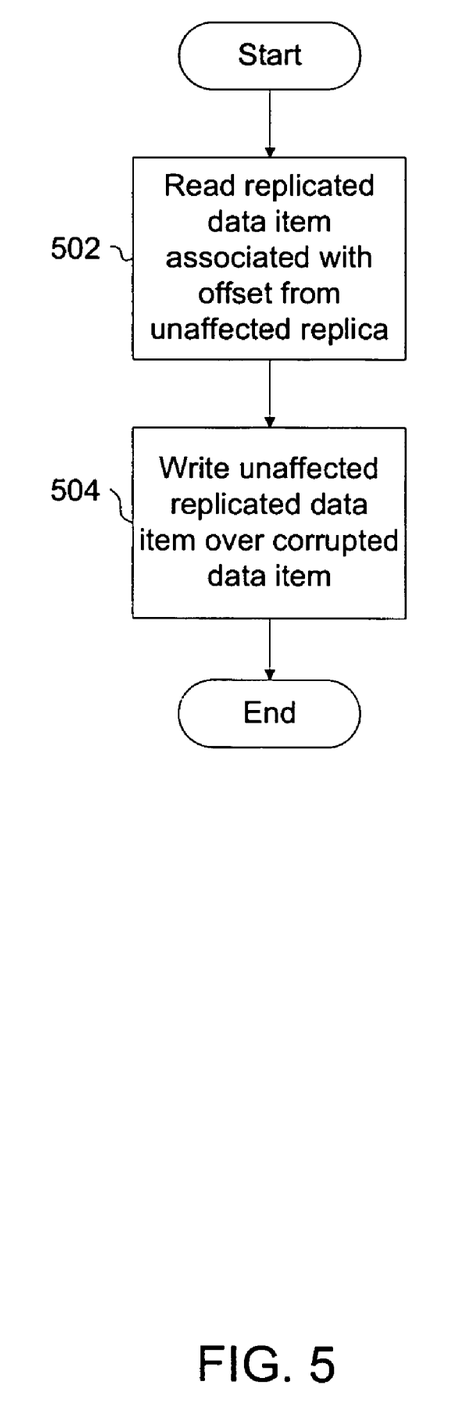
FIG. 5 is a flow diagram illustrating an exemplary process for recovering replicated data items, in accordance to some embodiments of the invention.

FIG. 5 illustrates an exemplary process 500 for reconciling potentially corrupt replicated data items. First, an uncorrupted copy of a replicated data item associated with a log entry indicating a potential corruption is read from replica storage location (502) and used to overwrite any corrupted copies of the data item(504). This operation is repeated for each data item that caused an exception during a scan of log 204.

Figure 6:
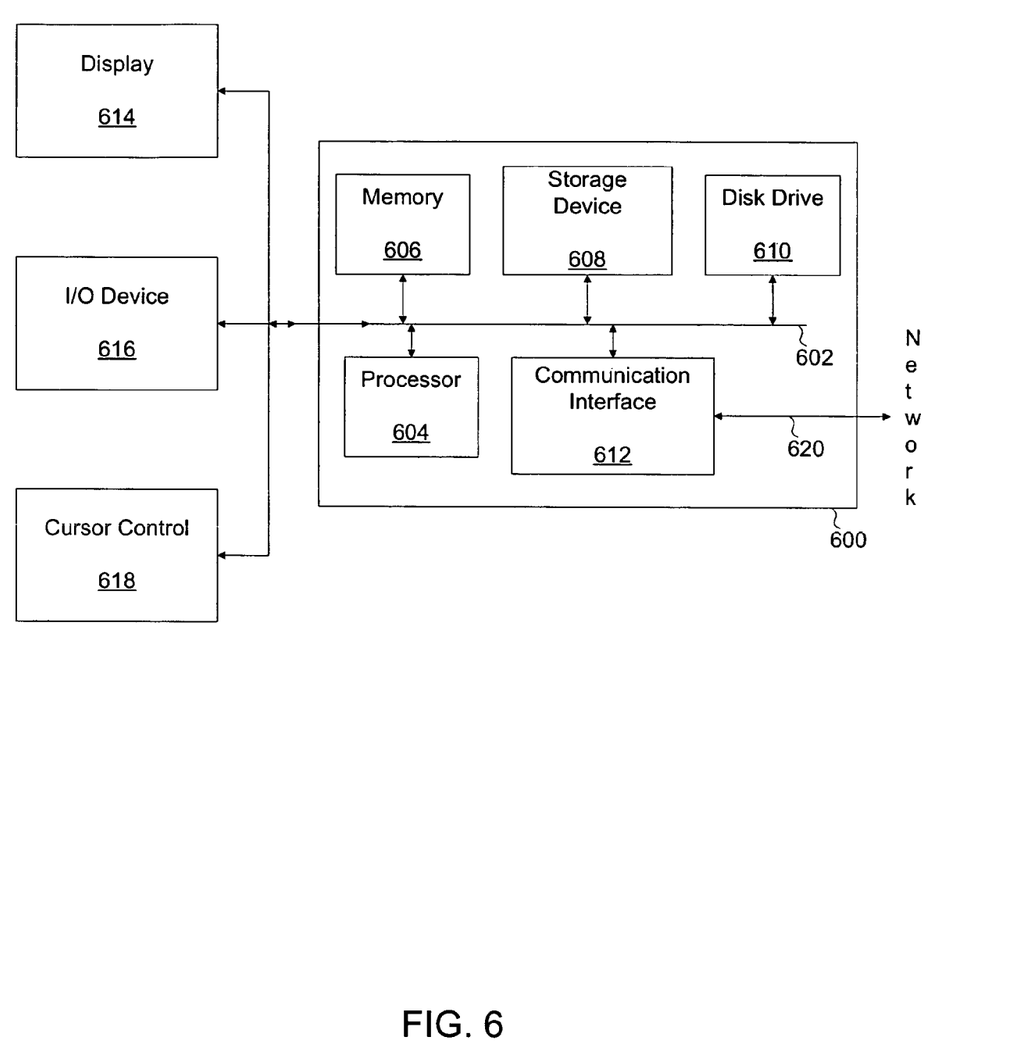
FIG. 6 is a block diagram illustrating an exemplary computer system suitable for recovering replicated data items, in accordance to some embodiments of the invention.

FIG. 6 is a block diagram illustrating an exemplary computer system suitable for recovering replicated data items, in accordance with some embodiments of the present invention. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to one embodiment of the invention, computer system 600 performs specific operations by processor 604 executing one or more sequences of one or more instructions contained in system memory 606. Such instructions may be read into system memory 606 from another computer readable medium, such as static storage device 608 or disk drive 610. In alternative embodiments, hard-wired circuitry may be used in place of or in combination with software instructions to implement the invention.

The term "computer readable storage medium" refers to any medium that participates in providing instructions to processor 604 for execution. Such the storage medium may take many forms, including but not limited to, non-volatile storage media, volatile storage media. Non-volatile storage media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable storage media includes, for example, floppy disk, flexible disk, hard disk, magnetic tape, any other magnetic medium, CD-ROM, RAM, PROM, EPROM, FLASH-EPROM, any other memory chip or cartridge, any other storage medium from which a computer can read.

In some embodiments of the invention, execution of the sequences of instructions to practice the invention is performed by a single computer system 600. According to other embodiments of the invention, two or more computer systems 600 coupled by communication link 620 (e.g., LAN, PSTN, or wireless network) may perform the sequence of instructions to practice the invention in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

Although the foregoing embodiments have been described in some detail for purposes of clarity of understanding, the invention is not limited to the details provided. There are many alternative ways of implementing the invention. The disclosed embodiments are illustrative and not restrictive.

We claim:

1. A method for recovering one or more replicated data items, the method comprising:

determining whether a log contains one or more entries indicating a corruption in a replicated data item, wherein the log is maintained at an application layer that is higher in a software hierarchy than a replicating logical device (RLDev) layer at which the replicated data item is recovered, and wherein determining whether the log contains one or more entries indicating a corruption in a replicated data item comprises performing a first scan of the log at the application layer and inferring an offset to determine whether an entry indicates a corruption in a replicated data item, wherein the log entries further contain a desired value of the replicated data item;

recovering the replicated data item if the log contains any such entries by comparing a plurality of copies of the replicated data item to identify a corrupted copy of the replicated data item and an uncorrupted copy of the replicated data item and replacing the corrupted copy of the replicated data item with the uncorrupted copy of the replicated data item;

reconciling a replicated data item at the (RLDev) layer in the software hierarchy by comparing the plurality of copies of the replicated data item to identify the corrupted copy of the replicated data item if a determination is made that a failure occurred during the operation;

performing a second scan of the log at the application layer to recover data associated with the application layer; and recovering the data associated with the application layer based on the second scan of the log.

2. The method recited in claim 1, further comprising identifying a location of the corrupted copy of the replicated data item using the inferred offset.

3. The method recited in claim 2, wherein the offset is part of a log entry.

4. The method recited in claim 1, wherein the log is maintained by a software module at the application layer in the software hierarchy.

5. A method for recovering one or more replicated records, the method comprising:

recording an entry in a log at an abstract data structure (ADS) layer in a software hierarchy, the entry indicating that an operation was performed on a replicated record, wherein the entry further indicates a desired value of the replicated record;

recovering the replicated record if the log contains any entries by comparing a plurality of copies of the replicated record to identify a corrupted copy of the replicated record and an uncorrupted copy of the replicated record and replacing the corrupted copy of the replicated record with the uncorrupted copy of the replicated record, wherein the log is maintained at the ADS layer in the software hierarchy that is higher in the software hierarchy than a replicating logical device (RLDev) layer at which the replicated record is recovered;

determining whether a failure occurred during the operation at least in part by performing a first scan of the log at the ADS layer and inferring an offset to determine whether a data item is potentially corrupted;

reconciling the replicated record at the RLDev layer by comparing a plurality of copies of the replicated record to identify a corrupted copy of the replicated record if a determination is made that a failure occurred during the operation;

maintaining the log at the ADS layer, the log storing the plurality of entries associated with changes to a plurality of replicated records for which multiple copies are maintained at the RLDev layer;

performing a second scan of the log at the ADS layer to recover data associated with the ADS layer; and recovering the data associated with the ADS layer based on the scan of the log;

wherein the ADS layer is a higher layer that is an application layer, and wherein the RLDev layer is a lower layer that is an operating system layer comprising a replicating device module.

6. The method recited in claim 5, further comprising:

reading data associated with the log entry; and creating a reconciled record by replacing the corrupted copy of the replicated record with a different copy of the replicated record.

7. The method recited in claim 5, further comprising replacing the record with an uncorrupted copy of the replicated record if it is determined that failure occurred during the operation.

8. The method recited in claim 5, wherein a log generated by software operating at the ADS layer is used by software operating at the RLDev layer to recover the replicated record.

9. A system for recovering one or more replicated data items, the system comprising:

a computer; and a computer program executable by the computer, wherein the computer program comprises computer instructions for:

maintaining a log at an abstract data structure (ADS) layer in a software hierarchy, the log storing a plurality of entries associated with changes to a plurality of replicated data items for which multiple copies are maintained at a replicating logical device (RLDev) layer below the ADS layer in the software hierarchy;

determining whether the log contains one or more entries indicating a corruption in a replicated data item at least in part by performing a first scan of the log at the ADS layer and inferring an offset to determine whether an entry indicates a corruption in a replicated data item, wherein the one or more entries further indicate a desired value of the replicated data item; and recovering the replicated data item if the log contains any such entries by comparing a plurality of copies of the replicated data item to identify a corrupted copy of the replicated data item and an uncorrupted copy of the replicated data item, wherein the log is maintained at the ADS layer;

identifying a location of the corrupted copy of the replicated data item using an offset, wherein the offset is part of an entry in the log;

determining whether a failure occurred during an operation;

reconciling a replicated record at the RLDev layer by comparing the plurality of copies of the replicated record to identify the corrupted copy of the replicated record if a determination is made that the failure occurred during the operation;

performing a second scan of the log at the ADS layer to recover data associated with the ADS layer; and recovering the data associated with the ADS layer based on the second scan of the log.

10. A system for recovering one or more replicated data items, the system comprising:

a computer; and a computer program executable by the computer, wherein the computer program comprises computer instructions for:

recording an entry in a log at an abstract data structure (ADS) layer in a software hierarchy, the entry indicating that an operation was performed on a replicated record, wherein the entry further indicates a desired value of the replicated data item;

determining whether a failure occurred during the operation at least in part by performing a first scan of the log at the ADS layer and inferring an offset to determine whether a data item is potentially corrupted;

recovering the replicated record if the log contains any entries by comparing a plurality of copies of the replicated record to identify a corrupted copy of the replicated record and an uncorrupted copy of the replicated record and replacing the corrupted copy of the replicated record with the uncorrupted copy of the replicated record, wherein the log is maintained at the ADS layer that is higher in the software hierarchy than a replicating logical device (RLDev) layer at which the replicated record is recovered;

identifying a location of the corrupted copy of the replicated data item using an offset, wherein the offset is part of a log entry;

reconciling the replicated record at the RLDev layer by comparing a plurality of copies of the replicated record to identify a corrupted copy of the replicated record if a determination is made that a failure occurred during the operation;

maintaining the log at the ADS layer, the log storing a plurality of entries associated with changes to the plurality of replicated records for which multiple copies are maintained at the RLDev layer;

performing a second scan of the log at the ADS layer to recover data associated with the ADS layer; and recovering the data associated with the ADS layer based on the second scan of the log.

11. A computer-readable storage medium comprising computer instructions executable by a computer for:

determining whether a log contains one or more entries indicating a corruption in a replicated data item, wherein the log is maintained at an application layer that is higher in a software hierarchy than a replicating logical device (RLDev) layer at which the replicated data item is recovered, and wherein determining whether the log contains one or more entries indicating a corruption in a replicated data item comprises performing a first scan of the log at the application layer and inferring an offset to determine whether an entry indicates a corruption in a replicated data item, wherein the one or more entries further indicate a desired value of the replicated data item;

recovering the replicated data item if the log contains any such entries by comparing a plurality of copies of the replicated data item to identify a corrupted copy of the replicated data item and an uncorrupted copy of the replicated data item and replacing the corrupted copy of the replicated data item with the uncorrupted copy of the replicated data item;

reconciling a replicated record at the RLDev layer in the software hierarchy by comparing the plurality of copies of the replicated record to identify the corrupted copy of the replicated record if a determination is made that a failure occurred during the operation;

storing, in the log, a plurality of entries associated with changes to a plurality of replicated data items for which multiple copies are maintained at the RLDev layer;

performing a second scan of the log at the application layer to recover data associated with the application layer; and recovering the data associated with the application layer based on the second scan of the log.

12. A computer-readable storage medium comprising computer instructions executable by a computer for:

recording an entry in a log at an abstract data structure (ADS) layer in a software hierarchy, the entry indicating that an operation was performed on a replicated record, wherein the entry further indicates a desired value of the replicated record;

recovering the replicated record if the log contains any entries by comparing a plurality of copies of the replicated record to identify a corrupted copy of the replicated record and an uncorrupted copy of the replicated record and replacing the corrupted copy of the replicated record with the uncorrupted copy of the replicated record, wherein the log is maintained at the ADS layer that is higher in the software hierarchy than a replicating logical device (RLDev) layer at which the replicated record is recovered;

identifying a location of the corrupted copy of the replicated record using an offset, wherein the offset is part of a log entry;

determining whether a failure occurred during the operation at least in part by performing a first scan of the log at the ADS layer and inferring an offset to determine whether a record is potentially corrupted;

reconciling the replicated record at the RLDev by comparing a plurality of copies of the replicated record to identify a corrupted copy of the replicated record if a determination is made that a failure occurred during the operation storing, in the log, a plurality of entries associated with changes to a plurality of replicated records for which multiple copies are maintained at the RLDev layer;

performing a second scan of the log at the ADS layer to recover data associated with the ADS layer; and recovering the data associated with the ADS layer based on the second scan of the log, wherein the ADS layer is a higher layer that is an application layer, and wherein the RLDev layer is a lower layer that is an operating system layer comprising a replicating device module.

* * * * *